United States Patent
Zhao et al.

(10) Patent No.: US 10,422,889 B2
(45) Date of Patent: Sep. 24, 2019

(54) RADIATION DETECTOR ASSEMBLY AND METHOD OF MAKING THE SAME

(71) Applicant: Nuctech Company Limited, Beijing (CN)

(72) Inventors: Bozhen Zhao, Beijing (CN); Qingjun Zhang, Beijing (CN); Ziran Zhao, Beijing (CN); Shuwei Li, Beijing (CN); Lifeng Sun, Beijing (CN); Wenjian Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/856,303

(22) Filed: Dec. 28, 2017

(65) Prior Publication Data

US 2018/0188388 A1    Jul. 5, 2018

(30) Foreign Application Priority Data

Dec. 29, 2016   (CN) .......................... 2016 1 1247731

(51) Int. Cl.
*G01T 1/20* (2006.01)

(52) U.S. Cl.
CPC .............. *G01T 1/2006* (2013.01); *G01T 1/20* (2013.01); *G01T 1/2002* (2013.01); *G01T 1/2018* (2013.01)

(58) Field of Classification Search
CPC ......... G01T 1/02; G01T 1/2907; G01T 1/208; G01T 1/2018; G01T 1/2006; G01T 1/2002; G01T 1/20
See application file for complete search history.

(56) References Cited

U.S. PATENT DOCUMENTS 5,605,867 A * 2/1997 Sato .................... C23C 16/0272
                                                        118/715
2002/0005489 A1   1/2002 Kasuyama et al.
(Continued)

FOREIGN PATENT DOCUMENTS

JP         2007-324502 A    12/2007
JP         2013-88381 A      5/2013
(Continued)

OTHER PUBLICATIONS

Yeom et al., "Optimizing timing performance of Silicon photomultiplier based scintillation detectors," 2012, IEEE Nuclear science symposium and Medical imaging conference record, vol. M16-14, pp. 3119-3121. (Year: 2012).*

(Continued)

*Primary Examiner* — Kiho Kim
(74) *Attorney, Agent, or Firm* — Scully, Scott, Murphy & Presser, P.C.

(57) ABSTRACT

A radiation detector assembly and a method of manufacturing the same are provided. The radiation detector assembly includes a base and an outer encapsulation layer. The base includes a scintillator having a light-entering surface and a light-exiting surface on both ends thereof, respectively; a reflection layer provided on the light-entering surface and an outer peripheral surface of the scintillator; a photosensor comprising a photosensitive surface and an encapsulation housing, the photosensitive surface is coupled to the light-exiting surface via an optical adhesive; and an inner encapsulation layer adhered to an outer surface of the reflection layer and hermetically encapsulates a coupling portion where the scintillator and the photosensor connected with each other. The outer encapsulation layer is provided on the outer surface of the base.

17 Claims, 3 Drawing Sheets

(56) References Cited

U.S. PATENT DOCUMENTS

| | | | |
|---|---|---|---|
| 2003/0209671 A1* | 11/2003 | Frederick | G01T 1/202 250/363.01 |
| 2010/0200763 A1* | 8/2010 | Thon | H01J 43/18 250/370.11 |
| 2010/0276600 A1* | 11/2010 | Ronda | G01T 1/2002 250/362 |
| 2012/0267535 A1 | 10/2012 | Nakatsugawa et al. | |
| 2014/0097345 A1* | 4/2014 | Gayshan | G01T 1/202 250/361 R |
| 2014/0339408 A1 | 11/2014 | Ziegler et al. | |
| 2015/0001397 A1* | 1/2015 | Yang | B01J 20/06 250/361 R |
| 2015/0338529 A1 | 11/2015 | Svenonius et al. | |
| 2016/0266260 A1* | 9/2016 | Preston | G01T 1/02 |

FOREIGN PATENT DOCUMENTS

| | | |
|---|---|---|
| JP | 2016-95189 A | 5/2016 |
| WO | 02/10796 A1 | 2/2002 |

OTHER PUBLICATIONS

Extended European Search Report dated Jun. 7, 2018 received in European Patent Application No. 17 21 1166.8.

* cited by examiner

RADIATION DETECTOR ASSEMBLY AND METHOD OF MAKING THE SAME

CROSS REFERENCE

This application is based upon and claims priority to Chinese Patent Application No. 201611247731.1, filed on Dec. 29, 2016, the entire contents thereof are incorporated herein by reference.

TECHNICAL FIELD the present disclosure relates to a radiation detector assembly having a scintillator and a method of manufacturing the radiation detector assembly.

BACKGROUND

Among existing various radiation detectors, solid scintillator detector solid scintillator detectors are widely used and have great demand, and possess characteristics such as a compact volume and a high detection efficiency. In the solid scintillator detector, a detector assembly composed of a scintillator (cesium iodide, cadmium tungstate, etc.) and a photosensor (photodiode, photomultiplier tube, etc.) is a core component and also the most important part for affecting the detector performance index. In general, detection principle of the scintillator detector is that the scintillator absorbs the incident ray energy and converts the energy into scintillation light in equal proportion (the spectral range is generally between a near-infrared to a near-ultraviolet). Flashing light is absorbed by the photosensor and converted into electrical signals, and the electrical signals are transmitted to a readout circuit of the detector for further treatment.

The typical detector assembly is formed by coupling the scintillator to the photosensor through an optical adhesive. The coupling portion is between the light-exiting surface of the scintillator and the light-sensing surface of the photosensor. The optical adhesive has a higher optical refractive index and can reduce variation of the reflective index on an optical path from the scintillator to the photosensor, and thus improve the transmission efficiency of scintillation light. In addition, optical adhesive also has a certain bonding strength and hardness, the scintillator and the photosensor can be secured such that the relative location therebetween cannot be changed.

In a majority of operation environment of the detectors such as at a temperature of −25° C. to 40° C., and at a humidity of 0% to 60%, the detector assembly has a stable performance. But in a high-temperature and high-humidity environment such as at a temperature of over 70° C., and at a humidity of over 80%, it can be observed that sensitivity of the detector assembly (the most important performance index) will gradually decrease as the time increases, water molecules in the air have high density, the optical adhesive penetrated between the of the scintillator and the photosensor reaches a bonding surface to reduce bonding strength between the adhesive and the device, and thereby separating the adhesive from the device. The optical path with larger refractive index is formed between the separated adhesive and the device such that transmission efficiency of the flashing light can be reduced.

The above information disclosed in the Background is merely used to reinforce understanding of the background knowledge of the present disclosure, and thereby may contain information that is already known by a person of ordinary skill in the art.

SUMMARY

Additional aspects and advantages of the present disclosure will be set forth in part in the description and will be obvious in part from the description, or may be learned by implementation of the present disclosure.

According to one aspect of the present disclosure, a radiation detector assembly includes a base and an outer encapsulation layer. the base includes a scintillator having a light-entering surface and a light-exiting surface on both ends thereof, respectively; a reflection layer provided on the light-entering surface and an outer peripheral surface of the scintillator; a photosensor comprising a photosensitive surface and an encapsulation housing, the photosensitive surface is coupled to the light-exiting surface via an optical adhesive; and an inner encapsulation layer adhered to an outer surface of the reflection layer and hermetically encapsulates a coupling portion where the scintillator and the photosensor connected with each other. the outer encapsulation layer is provided on the outer surface of the base.

According to another aspect of the present disclosure, a method of manufacturing a radiation detector assembly includes steps of:

forming a base, wherein the base includes a scintillator, a photosensor and an inner encapsulation layer; the scintillator has a light-entering surface and a light-exiting surface on both ends thereof, respectively; and a reflection layer is provided on the light-entering surface and an outer peripheral surface of the scintillator; the photosensor is coupled to the light-exiting surface of the scintillator via an optical adhesive; the inner encapsulation layer is adhered to the outer surface of the reflection layer and hermetically encapsulates the coupling portion between the scintillator and the photosensor; and forming an outer encapsulation layer on the outer surface of the base by chemical deposition.

BRIEF DESCRIPTION OF THE DRAWINGS

The foregoing features, aspects and advantages of the present disclosure will become more apparent from the following detailed description of the invention when taken in conjunction with the accompanying drawings.

Figure 1:
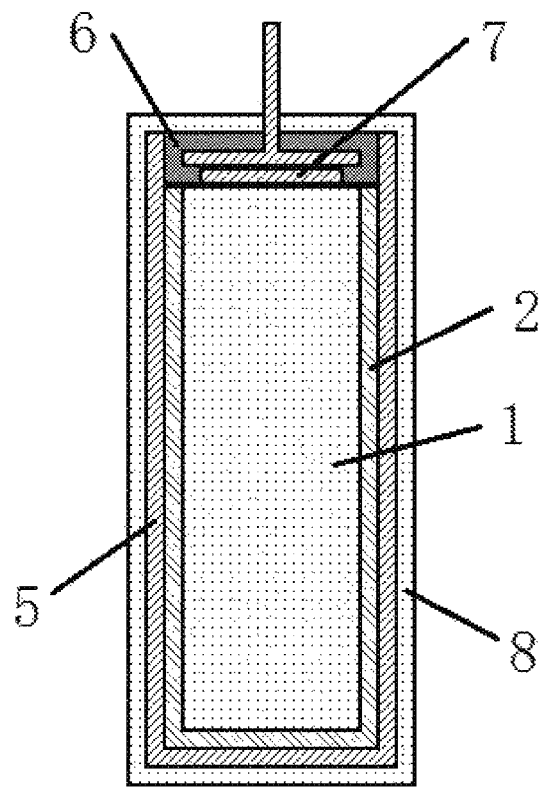
FIG. 1 is a schematic structural view of a detector assembly according to an embodiment of the present disclosure.
Figure 2:
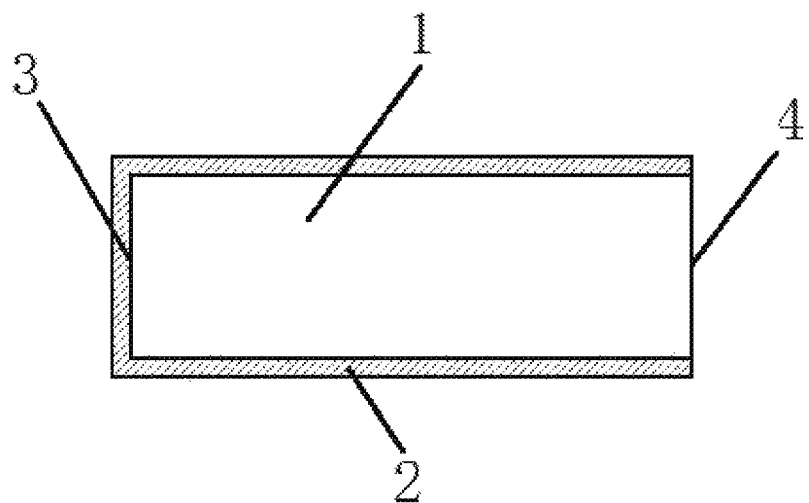
FIG. 2 is a schematic view of the scintillator in FIG. 1.
Figure 3:
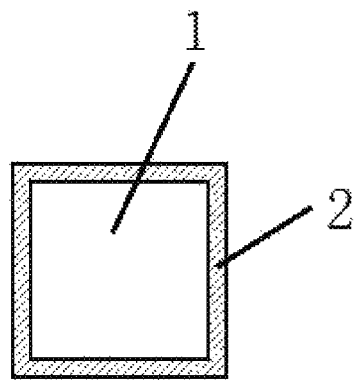
FIG. 3 is a right side view of FIG. 2.

In the drawings: 1. scintillator; 2. reflection layer; 3. light-entering surface; 4. light-exiting surface; 5. inner encapsulation layer; 6. optical adhesive; 7. photosensor; 8 outer encapsulation layer; 10. base.

DETAILED DESCRIPTION

Exemplary embodiments will be completely described with reference to the drawings. the present disclosure may, however, be embodied in many different forms and should not be construed as limited to the exemplar) embodiments set forth herein. Rather, these exemplary embodiments are provided so that the present disclosure is thorough and complete, and will fully convey the scope of the present disclosure to those skilled in the art. The same reference numbers will be used throughout the drawings to refer to the same or like parts, thereby the detailed description thereof will be omitted.

The First Embodiment

As shown in FIG. 1 to FIG. 5, an embodiment of the present disclosure discloses a radiation detector assembly, which includes a base 10 and an outer encapsulation layer 8 chemically deposited on the outer surface of the base 10.

As shown in FIG. 1 to FIG. 4, the base 10 of the present embodiment includes a scintillator 1, a photosensor 7 and an inner encapsulation layer 5. The scintillator 1 may be a cuboid having a cross section that is rectangular. The two ends of the scintillator 1 are a light-entering surface 3 and a light-exiting surface 4, respectively. A reflection layer 2 is provided on the light-entering surface of the scintillator 1 and the outer peripheral surface of the scintillator 1. At the time of detection, rays enter the scintillator 1 through the light-entering surface 3, while the light that is emitted by the scintillator 1 influenced by the rays is emitted out of the light-exiting surface 4.

The photosensor 7 is coupled to the light-exiting surface 4 of the scintillator 1 through an optical adhesive 6. The inner encapsulation layer 5 is adhered to the outer surface of the reflection layer 2, and can hermetically encapsulates the coupling portion where the scintillator 1 and the photosensor 7 connected with each other. The inner encapsulation layer 5 may be made of materials having a low water vapor transmission rate to reduce probability that water molecules are permeated, and include at least one metal film layer and/or organic film layer. One, two or even more layers may be selected as needed. A tin film, aluminum film or copper film can be selected as the metal film layer, but not limited thereto. The thickness of the inner encapsulation layer may be generally less than 0.1 mm.

The inner encapsulation layer 5 may be only adhered to a partial area close to the light-exiting surface, and also adhered to the outer surface throughout the reflection layer when adhering to the outer surface of the reflection layer. The inner encapsulation layer 5 slightly protrudes out of the light-exiting surface 4 and forms an annular cofferdam. After the scintillator 1 is erected, an appropriate amount of optical adhesive 6 can be dripped into the cofferdam. The photosensor 7 is disposed in the optical adhesive 6, the photosensitive surface of the photosensor 7 is adhered to the light-exiting surface, and the optical adhesive 6 covers the encapsulating housing of the photosensor and is flush with the top end portion of the cofferdam. The photosensor 7 and the scintillator 1 are fixed after the optical adhesive 6 is solidified. It should be noted that the order of connecting the inner encapsulation layer 5 and the photosensor 7 to the scintillator 1 is not limited, that is, the photosensor 7 may be coupled to the scintillator 1 and then adhered to the inner encapsulation layer 5.

The outer encapsulation layer 8 can be a compact organic thin film formed by low pressure chemical deposition (LP-CVD). The outer encapsulation layer 8 has a thickness that is not less than 10 micrometers.

In the radiation detector assembly of the present disclosure, a portion where the photosensor 7 is coupled to the scintillator 1 is primarily sealed by using the inner encapsulation layer 5, and then further sealed by using the outer encapsulation layer, and the tiny gas of the respective components can be filled, as a result, penetration of the water molecules on the side of the scintillator can be inhibited; the path length as required for diffusing the water molecules to the coupling portion between the photosensor and the light-exiting surface can be prolonged; separation of the optical adhesive from the device caused by penetrating the water molecules into the adhering surface between the scintillator, the photosensor and the optical adhesive due to higher kinetic energy under the action of high temperature can be prevented; reliability and service life of the radiation detector assembly under the high-temperature and high-humidity environment (at a temperature of over 70° C., and at a humidity of over 80%) can be improved, to ensure that the radiation detector assembly can be operated stably and reliably under the environment of high-temperature and high-humidity for a long time. Furthermore, the cofferdam is formed at the light-exiting surface by using the inner encapsulation layer 5, and the housing of the photosensitive device can be covered by the optical adhesive, to avoid the water molecules from being permeated from the housing of the photosensor, and thereby improving the reliability. The thickness of the inner and outer encapsulation layers of the present disclosure is smaller, i.e., the inner encapsulation layer has a thickness of less than 0.1 mm, and the outer encapsulation layer has a thickness of no less than 10 microns. The weight of the radiation detector assembly is hardly increased and thereby the detection result cannot be affected.

The Second Embodiment

Referring to FIG. 1 to FIG. 5, the present embodiment discloses a method for manufacturing a radiation detector assembly according to the first embodiment. The manufacturing method includes the following steps of forming a base 10 that includes a scintillator 1, a photosensor 7 and an inner encapsulation layer 5. Both ends of the scintillator 1 have a light-entering surface 3 and a light-exiting surface 4, respectively. A reflection layer 2 is provided on the light-entering surface 3 and the outer peripheral of the scintillator 1. The photosensor 7 is coupled to the light-exiting surface 4 of the scintillator 1 via the optical adhesive 6. The inner encapsulation layer 5 is adhered to the outer surface of the reflection layer 2 and hermetically encapsulates the coupling portion where the scintillator 1 and the photosensor 7 connected with each other.

Figure 4:
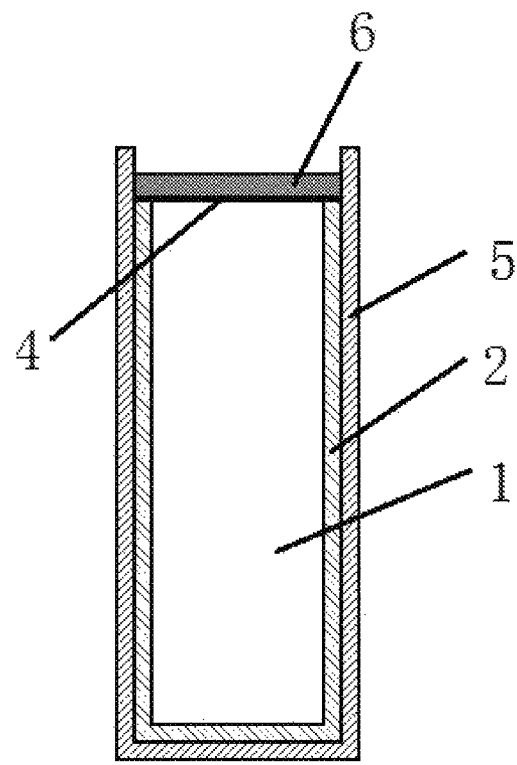
FIG. 4 is a schematic view when the scintillator is combined with an inner encapsulation layer in FIG. 1.
Figure 5:
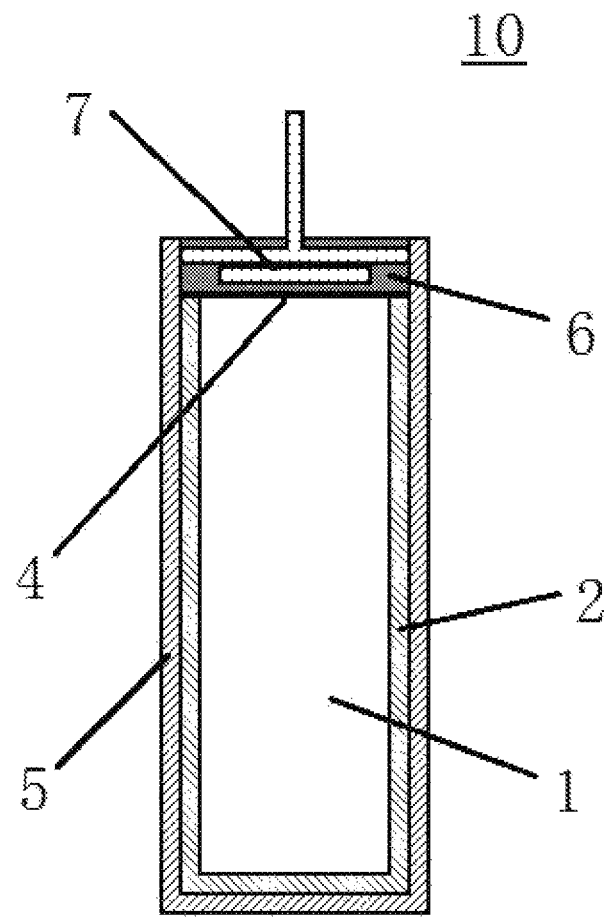
FIG. 5 is a schematic view of a base in FIG. 1.

Wherein, the inner encapsulation layer 5 may include at least one metal film layer and/or organic film layer. In the present embodiment, when the base 10 is formed, firstly, as shown in FIG. 4 and FIG. 5, the inner encapsulation layer 5 encloses a cofferdam protruding from the light-exiting surface 4 on the scintillator 1, and then the scintillator is erected so that the light-exiting surface 4 is above the light-entering surface 3. An optical adhesive 6 is added into the cofferdam, and the photosensor 7 is disposed into the optical adhesive 6 so that the photosensitive surface of the photosensor 7 is attached to the light-exiting surface 4, and of the optical adhesive 6 covers the encapsulating housing of the photosensor 7 and is flush with the top end portion of the cofferdam.

forming an outer encapsulation layer 8 on the outer surface of the base 10 by chemical deposition. In the formation of the outer encapsulation layer 8, an organic thin film having a thickness of not less than 10 μm is chemically deposited on the outer surface of the base by means of low-pressure chemical deposition. In a process of the chemical deposition, appropriate protection measures can be implemented on the signal interface of the photosensor 7 to prevent the organic thin film from clogging the signal interface.

In the radiation detector assembly of the present disclosure, a portion where the photosensor 7 is coupled to the scintillator 1 is primarily sealed by using the inner encapsulation layer 5, and then further sealed by using the outer encapsulation layer, and the tiny gas of the respective components can be filled, as a result, penetration of the water molecules on the side of the scintillator can be inhibited; the path length as required for diffusing the water molecules to the coupling portion between the photosensor and the light-exiting surface can be prolonged; separation of the optical adhesive from the device caused by penetrating the water molecules into the adhering surface between the scintillator, the photosensor and the optical adhesive due to higher kinetic energy under the action of high temperature can be prevented; reliability and service life of the radiation detector assembly under the high-temperature and high-humidity environment (at a temperature of over 70° C., and at a humidity of over 80%) can be improved, to ensure that the radiation detector assembly can be operated stably and reliably under the environment of high-temperature and high-humidity for a long time. The thickness of the inner and outer encapsulation layers of the present disclosure is smaller, the weight of the radiation detector assembly is hardly increased, and thereby the detection result cannot be affected.

While the present disclosure has been described in detail in connection with the exemplary embodiments, it should be readily understood that the present disclosure is not limited to such disclosed embodiments. Rather, various alternations and equivalents of such metes and bounds are therefore intended to be embraced by the appended claims.

What is claimed is:

1. A radiation detector assembly, comprising:
   a base, comprising:
      a scintillator, having a light-entering surface and a light-exiting surface on both ends thereof, respectively;
      a reflection layer, provided on the light-entering surface and an outer peripheral surface of the scintillator;
      a photosensor, comprising a photosensitive surface and an encapsulation housing, wherein the photosensitive surface is coupled to the light-exiting surface via an optical adhesive; and
      an inner encapsulation layer, adhered to an outer surface of the reflection layer and hermetically encapsulating a coupling portion where the scintillator and the photosensor connected with each other, wherein the inner encapsulation layer encapsulates the photosensor; and
   an outer encapsulation layer, provided on the outer surface of the base.

2. The radiation detector assembly according to claim 1, wherein the outer encapsulation layer is chemically deposited on the outer surface of the base.

3. The radiation detector assembly according to claim 2, wherein the inner encapsulation layer encloses a cofferdam protruding from the light-exiting surface on the scintillator, and the optical adhesive is disposed in the cofferdam, the photosensor is disposed in the optical adhesive, and the photosensitive surface of the photosensor is attached to the light-exiting surface, the optical adhesive covers the encapsulating housing of the photosensor and is flush with the top end portion of the cofferdam.

4. The radiation detector assembly according to claim 1, wherein the outer encapsulation layer is an organic thin film formed by means of low-pressure chemical deposition.

5. The radiation detector assembly according to claim 4, wherein the inner encapsulation layer encloses a cofferdam protruding from the light-exiting surface on the scintillator, and the optical adhesive is disposed in the cofferdam, the photosensor is disposed in the optical adhesive, and the photosensitive surface of the photosensor is attached to the light-exiting surface, the optical adhesive covers the encapsulating housing of the photosensor and is flush with the top end portion of the cofferdam.

6. The radiation detector assembly according to claim 1, wherein the inner encapsulation layer comprises at least one metal film layer and/or organic film layer.

7. The radiation detector assembly according to claim 6, wherein the inner encapsulation layer encloses a cofferdam protruding from the light-exiting surface on the scintillator, and the optical adhesive is disposed in the cofferdam, the photosensor is disposed in the optical adhesive, and the photosensitive surface of the photosensor is attached to the light-exiting surface, the optical adhesive covers the encapsulating housing of the photosensor and is flush with the top end portion of the cofferdam.

8. The radiation detector assembly according to claim 1, wherein the inner encapsulation layer has a thickness less than 0.1 mm; and/or the outer encapsulation layer has a thickness of not less than 10 μm.

9. The radiation detector assembly according to claim 8, wherein the inner encapsulation layer encloses a cofferdam protruding from the light-exiting surface on the scintillator, and the optical adhesive is disposed in the cofferdam, the photosensor is disposed in the optical adhesive, and the photosensitive surface of the photosensor is attached to the light-exiting surface, the optical adhesive covers the encapsulating housing of the photosensor and is flush with the top end portion of the cofferdam.

10. The radiation detector assembly according to claim 1, wherein the scintillator is a cuboid having a rectangular cross section.

11. The radiation detector assembly according to claim 10, wherein the inner encapsulation layer encloses a cofferdam protruding from the light-exiting surface on the scintillator, and the optical adhesive is disposed in the cofferdam, the photosensor is disposed in the optical adhesive, and the photosensitive surface of the photosensor is attached to the light-exiting surface, the optical adhesive covers the encapsulating housing of the photosensor and is flush with the top end portion of the cofferdam.

12. The radiation detector assembly according to claim 1, wherein the inner encapsulation layer encloses a cofferdam protruding from the light-exiting surface on the scintillator, and the optical adhesive is disposed in the cofferdam, the photosensor is disposed in the optical adhesive, and the photosensitive surface of the photosensor is attached to the light-exiting surface, the optical adhesive covers the encapsulating housing of the photosensor and is flush with the top end portion of the cofferdam.

13. A method of manufacturing a radiation detector assembly, comprising:
   forming a base, wherein the base comprises a scintillator, a photosensor and an inner encapsulation layer; the scintillator has a light-entering surface and a light-exiting surface on both ends thereof, respectively; and a reflection layer is provided on the light-entering surface and an outer peripheral surface of the scintillator; the photosensor is coupled to the light-exiting surface of the scintillator via an optical adhesive; the inner encapsulation layer is adhered to the outer surface of the reflection layer and hermetically encapsulates the coupling portion between the scintillator and the photosensor, and the inner encapsulation layer encapsulates the photosensor; and forming an outer encapsulation layer on the outer surface of the base by chemical deposition.

14. The method of manufacturing the radiation detector assembly according to claim 13, wherein forming an organic thin film on the outer surface of the base by means of a chemical deposition while forming the outer encapsulation layer.

15. The method of manufacturing the radiation detector assembly according to claim 14, wherein forming an organic thin film on the outer surface of the base by means of a low-pressure chemical deposition while forming the outer encapsulation layer.

16. The method of manufacturing the radiation detector assembly according to claim 13, wherein the inner encapsulation layer comprises at least one metal film layer and/or organic film layer.

17. The method of manufacturing the radiation detector assembly according to claim 13, wherein when the substrate is formed, firstly, the inner encapsulation layer encloses a cofferdam protruding from the light-exiting surface on the scintillator, and then the scintillator is presented in a erected state so that the light-exiting surface is above the light-entering surface, optical adhesive is added into the cofferdam, and the light sensitive device is disposed in the optical adhesive so that the photosensitive surface of the photosensor is attached to the light-exiting surface, and the optical adhesive covers a encapsulating housing of the photosensor and is flush with the top end portion of the cofferdam.

* * * * *